Sept. 14, 1954

H. OESTRICH ET AL 2,688,842

FUEL METERING DEVICE FOR TURBOPLANTS, PARTICULARLY FOR AIRCRAFT

Filed April 11, 1949

Patented Sept. 14, 1954

2,688,842

UNITED STATES PATENT OFFICE 2,688,842

FUEL METERING DEVICE FOR TURBO-PLANTS, PARTICULARLY FOR AIRCRAFT

Hermann Oestrich and Lorenz Schneider, Decize, France; said Schneider assignor to said Oestrich Application April 11, 1949, Serial No. 86,702

Claims priority, application France April 20, 1948

6 Claims. (Cl. 60—35.6)

Our invention has for its object an arrangement for measuring and feeding fuel for reaction jet turbines and propeller turbines, that satisfy the conditions disclosed fully hereinafter.

Within the range of operation extending substantially up to one-half full-load conditions of running, the injection volume is measured by hand-controlled members. Beyond this range, the constancy of the rate of running selected, that is of the speed of rotation selected and of the predetermined temperature of the combustion chamber, is obtained through an automatic arrangement for all atmospheric and flight conditions. Any modification in the speed of rotation acts through the agency of a centrifugal regulator on the injection volume while the temperature in the combustion chamber, that is measured indirectly, acts in the case of a jet reaction nozzle on the output section of said nozzle and, in the case of a variable pitch blade propeller on the pitch of the propeller blades. The temperature of the combustion chamber is defined through the association of a drop in pressure through the compressor $\Delta p$, defined previously, with the injection volume $D_i$ in accordance with the relationship $D_i = k_1 + k_2 . \Delta p$, that remains true for a constant temperature in the combustion chamber, $k_1$ and $k_2$ being constants depending on the power unit considered.

As the use of injectors with two outputs is contemplated, the injection volume is constituted by a constant basic volume associated with a main volume that is submitted to measuring.

When starting, special injectors for starting purposes and the normal operating injectors are fed with a fuel that is particularly inflammable.

In case of failure of the automatic measuring arrangement, the power unit may be controlled by hand.

The control of the arrangement considered is performed by means of a single lever.

With the foregoing object in view, our invention comprises a hand-controlled fuel metering device for a turbo-plant having a fuel burner system, a fuel pressure trunk line, a gas turbine and an air compressor driven from the gas turbine, the hand-controlled fuel metering device being designed for combination with a unit adapted to control the rate of flow of fuel to the burner system automatically in dependence on the speed of the gas turbine.

According to this invention, the hand-controlled fuel metering device forms a unit in itself and it comprises a basic fuel line, a main fuel line and a discharge fuel line connected with said trunk line to receive the fuel effluent therefrom, hand controlled valve means in said basic fuel line and said main fuel line for controlling the rate of flow of fuel therethrough in interdependence, means for connecting said main fuel line with said first-named unit and thereby causing the effluent from said main fuel line to be controlled by said first-named unit before being forwarded to said fuel burner system, said basic fuel line being connected with said fuel burner system, and a slow-running fuel line branched off from said trunk line in parallel with the first-named three lines with said hand-controlled valve means also inserted therein so as also to have the rate of flow of fuel therethrough controlled by said valve means, said slow-running fuel line being connected with said main fuel line past said valve means and having an adjustable flow restricting member inserted therein.

The following description referring to accompanying drawings and given out by way of exemplification and by no means in a binding sense will allow ascertaining readily how the invention may be executed, the features appearing both in the drawings and in the specification forming obviously part of the invention. In said drawings.

Figures 1, 7:
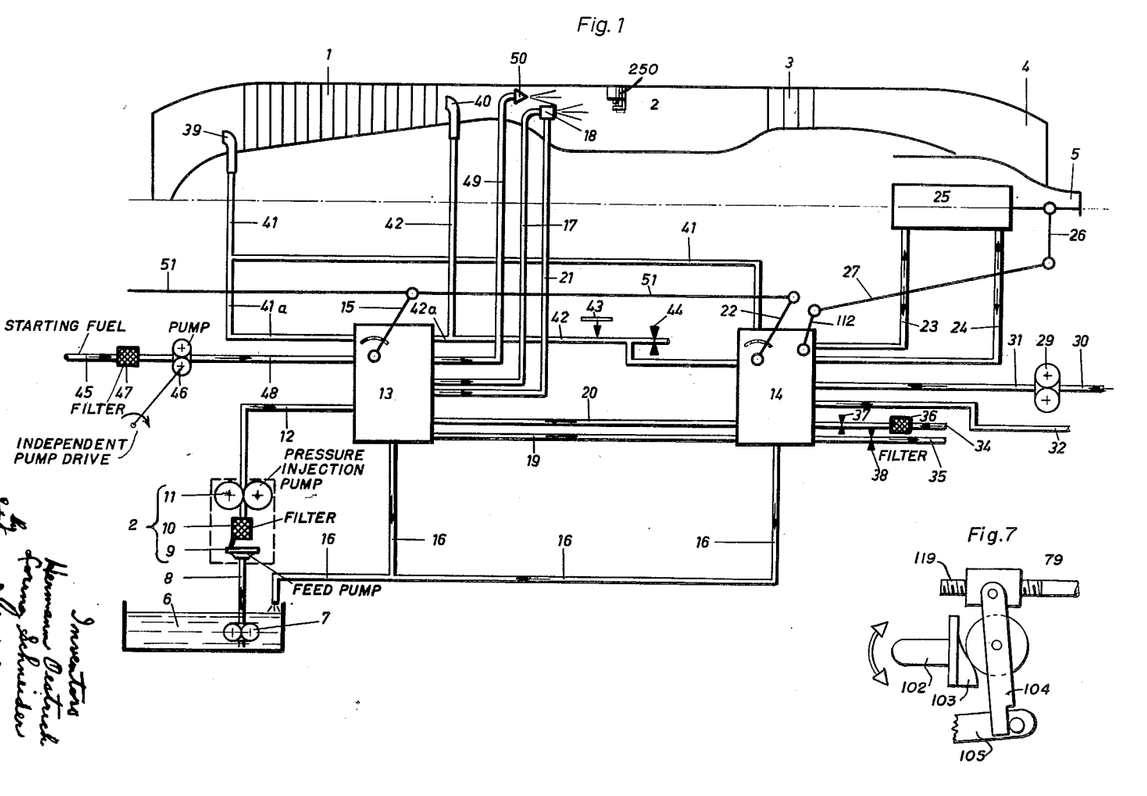
Fig. 1 illustrates diagrammatically an arrangement for measuring and feeding fuel, designed for a jet reaction nozzle propelling plant for aircraft in accordance with the invention.
Fig. 7 is an elevation of a portion of device D of Fig. 3.

In Fig. 1 are shown the usual components of a jet reaction nozzle propelling plant for aircraft, of which the compressor is designated by the reference number 1, the combustion chamber by 2, the turbine by 3 and the ejecting nozzle by 4. The shifting of the needle valve 5 has for its object to modify the ejecting section.

The feed circuit is designed as follows: Pumps provided in the tank 6 and illustrated at 7 deliver the fuel through the pipe 8 towards the feed pump 9 under a pressure that takes into account the vapor pressure of the fuel considered in order to prevent efficiently any danger of boiling at high altitude. The feed pump 9 delivers in its return the fuel through a filter 10 into the high pressure injection pump 11 that is of the gear pump type. The feed pump 9 does away with any cavitation and defective filling of the teeth intervals in the gear pump 11. Furthermore, any clogging of the filter through the formation of fuel crystals therein at very low temperatures is prevented through the very fact of the heating of the fuel inside the feed pump. In order to obtain a minimum weight and bulk, the feed pump 9, the filter 10 and the injection pump 11 are grouped into a single unit. Beyond the injection pump 11, the fuel is directed through the pipe 12 towards the control apparatus 13. The latter that is illustrated separately in Fig. 2 and described in full detail hereinafter is associated with the regulating or measuring apparatus 14 illustrated separately in Fig. 3 and for which fuller details will also be given hereinafter. The regulator 14 encloses all the automatic regulating elements that are submitted to the action of the power unit. The control apparatus 13 incorporates all the other control members required for measuring the fuel and feeding it to the power unit. In the range corresponding to reduced rotary speeds which we may term the range of hand-operated control by reason of the regulator 14 not being yet operative for said range, the control apparatus 14 provides for the measuring of the injection volume under the control of control valves or the like actuated through the lever 15. It should be noticed in this respect that in the case of a failure of the automatic regulator 14, the power unit may as well be controlled by hand beyond said range of reduced rotary speed through the agency of said controlling apparatus 13. In the controlling apparatus 13 the output of fuel provided by the injection pump 11 is divided into a constant basic volume as stated and a main volume submitted to measuring or regulation. The basic volume forms the minimum volume required for making the combustion active. This basic volume is fed through the pipe 17 to the injectors 18 of the two output type (diagrammatically shown in cross section on a larger scale on Fig. 4). In Fig. 1, one of these well known injectors has been illustrated. On the other hand, the main fuel volume reaches the regulator 14 through the pipe 19 where it is measured in accordance with predetermined conditions of operation, taking into account the basic volume. The excess of the main output is returned into the return pipe 16 while the volume intended for injection is returned through the pipe 20 into the control apparatus 13. After it has passed through a pressure limiting means inside the control apparatus 13, this volume is also directed towards the injectors 18 of the two output type through the pipe 21. The injectors 18 collect thus both the basic and the main volumes. In the case of a reduction in pressure inside the main pipe circuit 21 for certain rates of operation, the excess pressure that is kept constant inside the basic circuit 17, provides constantly for a perfect atomisation of the total output. The regulator 14 keeps automatically at a constant rate, within the range of automatic regulation, the mechanical and thermic loads given out by the angular position of the control lever 22 for any rate of flight and operation. To this purpose, the regulator includes a regulator for the speed of operation acting on the injection output and an indirect temperature regulator acting on the temperature in the combustion chamber. The latter regulator controls through the agency of the pipes 23 and 24 an auxiliary motor 25 adjusting the needle valve for the nozzle 5. 26—27 and 112 designate linkages forming part of the mechanical control for the nozzle adjusting system. The oil under pressure required for adjusting the nozzle is shunted through the high pressure pump 29 of the lubricating circuit of the power unit through the pipe 30. Through the pipe 31, said compressed oil is directed towards the control slide valve for the nozzle adjusting arrangement inside the regulator 14. The oil is returned through the pipe 32. The oil controlling the regulator of rotation speed inside the apparatus 14 is also shunted off the lubricating circuit of the power unit through the pipe 34, said oil being returned through the pipe 35. In the input channel for the oil 34 is arranged a filter 36 and a restriction 37. The return pipe 35 is also provided with a restriction 38. As disclosed hereinabove, it is necessary in order to make the temperature in the combustion chamber act on the measuring or regulation of the fuel, to resort to a drop in the pressure of the compressor of a predetermined value. In the example illustrated, we resort to the total difference between the pressures at the input and at the output of the compressor. Pressure taps 39 and 40 provided for this purpose transmit these pressures through the pipes 41 and 42 to the regulator 14. In order to control a valve to be described hereinafter, these pressures are furthermore transmitted through pipes 41a and 42a to the control apparatus 13. The pipe 42 (Figs. 1 and 5) is provided with an adjustable restriction 43 and on the downstream side of said restriction 43 is provided a draining restriction 44 adapted to prevent any accumulation of fluid in the pipe 42. These two restrictions allow of adjusting the difference in pressure $p\Delta$ required for regulating to an identical value the flow of fuel in different power units, so that the changing of the regulating members requires no particular adjustment. However the change of the compressor may require an adjustment of the restriction 43 by reason of the small differences in the operative data that are generally unavoidable between two compressors of the same type.

As fuels with a high boiling point as used for turbine power units have generally a high flash point, there is provided for the arrangement according to our invention means for initiating the combustion with fuel that is easily ignited; in other words, there is injected for the starting of the power unit such an easily inflammable fuel through the normal operative injectors and through auxiliary starting injectors provided specially for this purpose. This starting fuel fed through an auxiliary tank that is not illustrated enters the starting pump 46 through the pipe 45 and the filter 47 under a predetermined pressure. This pressure is necessary for removing any danger of boiling and may be obtained through a suitable head of liquid or by means of a tank pump. The starting pump 46 is driven independently of the power unit. It delivers the starting fuel through the pipe 48 towards the control apparatus 13. Beyond the control apparatus 13, the fuel considered is directed through non-return valves into the injection pipes 17—21 already mentioned and into the pipe 49 connected with the above mentioned starting injectors 50. These latter and also ignition plugs 25a serve for initiating the combustion in the combustion chamber of the power unit.

The lever 15 of the control apparatus 13 and the lever 22 of the regulator 14 are coupled for operation through the connecting rod 51 and their relative lengths of stroke are defined so as to allow control through a single lever.

Figure 2:
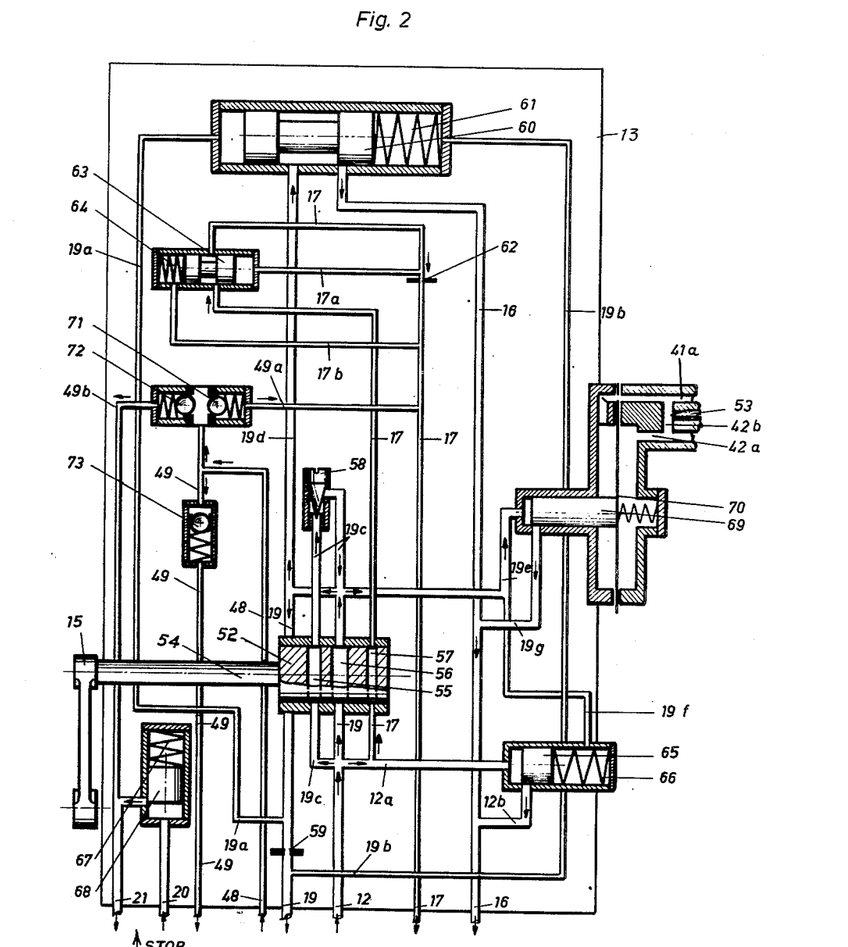
Fig. 2 illustrates diagrammatically the principle underlying the so-called control apparatus.

Turning to Fig. 2 illustrating the control apparatus designated by the reference 13 in Fig. 1, it includes the following members:

A hand controlled system including a rotary sleeve valve 52, a shaft 54 and lever 15 controlling it and bores 55—56 and 57 through it;

An adjusting screw 58 for idling operation;

A regulator for the main fuel volume constituted by a measuring restriction 59, a slide valve 60 and a valve spring 61.

The regulator for the basic fuel volume constituted by the measuring restriction 62, the slide valve 63 and the valve spring 64;

The differential valve 65 with its spring 66;

The loaded valve 68 with its spring 67;

The expansion valve 69 with its diaphragm 70;

The non return valves 71, 72 and 73.

The various members recited hereinabove are grouped inside a casing similar to that grouping the valves, that is not illustrated and this casing is provided with means for the interconnection of the members with one another and with the external pipes. The arrangement of these connections is illustrated on the drawings by corresponding lines.

Figure 6:
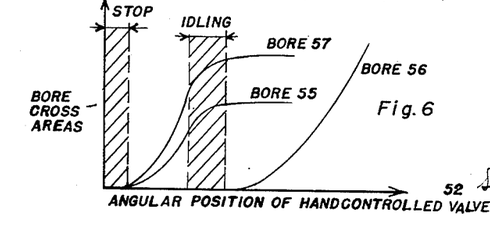
Fig. 6 is a diagram showing the variations of the available cross-areas of bores 55—57 in valve 52 of Fig. 2 as a function of the angular position of said valve.

The operation of the control apparatus illustrated is as follows:

All the fuel delivered by the injection pump 11 enters through the channel 12 into the control apparatus. Upstream with respect to the hand-operated controlling sleeve valve 52, the main pipe 12 is subdivided into three secondary pipes 19—19c and 17 corresponding respectively to the main injection volume, the idling injection volume and the basic injection volume. The bores 56—55 and 57 of the pilot valve 52 control correspondingly the flow of said fuel volumes. The angular relationship of the bores is illustrated by Fig. 6 which shows the variations of the cross-sections of the available fuel passages through each bore as a function of the angular position of hand-controlled valve 52 and will enable of better understanding the following explanations. The rotary valve being in its inoperative closing position, the three bores are closed and the admission of fuel to the power engine is closed. Through action on the control valve 52, it is possible to first uncover simultaneously the two bores 55 and 57. After a predetermined travel of the valve, these bores are completely opened at the same moment. The pipe 17 feeding the basic volume leads the fuel through the downstream side of the valve 52 towards the valve 63, that in association with the restriction 62 holds the output through the pipe 17 at a constant value. The auxiliary pipes 17a and 17b shown in dotted lines in the drawing transmit the prevailing drop in pressure across the restriction 62 to the ends of the valve 63 that is thus controlled. In the case where the difference in pressure across the restriction 62 is higher than or lower than the pressure of adjusted value of the valve spring 64, said valve 63 will be constrained to slide whereby the cross sectional passage afforded for the fuel passing through 17 is increased or reduced. In other words, the fuel output through the pipe 17 is modified until restoration is obtained of the desired difference in pressure and consequently of the initial basic volume of injection. When the fuel has passed through the valve 63, it is fed directly to the injector 18 (Fig. 1) for which it forms the basic output volume.

The pipe 19c for the idling output provides merely a by-pass for the channel 19 that has remained closed until then. Beyond the control bore 55, the pipe 19c leads to the adjusting screw 58 that may be controlled from the outside for adjusting the idling volume. Beyond said adjusting screw, the pipe 19c opens into the portion of the pipe 19 that is located on the downstream side of the control valve 52 and leading beyond said portion to the regulator and injectors. The idling consumption comprises the constant basic volume that continues being injected and a supplementary injection volume corresponding to idling requirements which latter is adjusted through the idling adjusting screw 58.

Through a further shifting of the hand controlled valve 52, the bore 56 is opened to allow the passage of the main injection volume, said bore being completely open after a predetermined travel of the valve. At the same time, the bores 55 and 57 remain completely open. The main volume is fed through the pipe 19 to the regulator and to the injectors. Said pipe 19 is connected to the overflow valve 60 through the branch pipe 19d. The measuring restriction 59 in the pipe 19 controls the flow into said overflow valve in a manner such that it is not possible for the output of fuel fed by the pipe 19 to the regulator to rise beyond a predetermined maximum value, the excess fuel returning through the pipe 19d into the return pipe 16. The loss of head through the restriction 59 is transmitted through the measuring pipes 19a—19b to the overflow valve 60, said measuring pipes opening into the end compartments of said valve.

For increased reliability, in particular for the pump, there is provided a differential valve 65 and spring 66 in shunt relationship with the control valve 52 in order to provide for constancy of the loss of head. This valve 65 is connected at one end through the pipe 12a with the main pipe 12, while the pipe 19f connects its other end with the pipe 19 and the pipe 12b connects a point of its length with the return pipe 16 in a manner such as to provide for a direct connection between said return pipe 16 and the pipes 12a and 12b when the delivery pressure from the injection pipe acting in the pipe 12a rises above the pressure in the channel 19f by a value that is greater than the adjusted pressure of the valve spring. The excess fuel thus delivered back by the pump returns consequently through the return pipe 16. In order to avoid within the range of hand controlled operation the rising of the temperature to exaggerated temperatures by reason of an acceleration that is too considerable, the ratio between the injection pressure of the fuel and the variation in pressure across the compressor should not rise beyond a predetermined value. This condition is satisfied through the operation of the overpressure valve 69—70 that is submitted on one side to the difference in pressure across the compressor and on the other to the injection pressure. If the injection pressure in the pipe 19 or 19e rises beyond the allowed value, it acts on the piston 69 that is submitted to the difference in pressure across the compressor and uncovers the connection with the pipe 19g through which the excess fuel delivered returns into the return pipe 16. The pressure on the downstream side of the compressor increases with the speed of rotation and closes then the valve. The pipe 41a submits the valve to the pressure on the upstream side of the compressor and the pipe 42a to that prevailing on the downstream side of the compressor. The adjustable restriction 53 arranged in the connecting pipe 52b between the pipes 41a and 42a allows adjusting the active difference in pressure across the compressor whereby the valve 69 may be controlled.

Through a shifting of the hand controlled valve beyond the position for which the uncovering of the bore 56 for the main injection volume is complete, the cross sectional area remains unvarying. The shifting has no influence on the injection volume of fuel because from this moment onwards automatic regulation becomes operative, the output regulators 59 and 60 of the control apparatus keeping the main volume at a value that is always the same, which volume is fed to the regulator 14 through the pipe 19.

That fuel portion which is controlled by regulator 14 to be forwarded to injectors 18, is delivered through pipe 20 to spring loaded valve 68 located in control apparatus 13 (Fig. 2) and thence to injectors 18 through pipe 21, said spring loaded valve 68 being designed for maintaining an overpressure in the pipe 17 for the basic volume with reference to the pipe 21 for the main volume of injection while a drop in pressure is provided thereby between the regulator and the return pipe so that the return of the fuel may be ensured even under low injection pressures. If the difference in pressure between the pipes 20 and 21 drops beneath a value defined by the valve spring 67, the valve 68 will close the opening in the valve and conversely.

When starting, an easily inflammable fuel is fed to the pipe 48. The latter is subdivided into three channels 49, 49a and 49b. A part of the starting fuel passes through the non-return valve 73 into the starting injectors 50 through the pipe 49 while a second portion passes into the pipe 17 for the basic volume of injection through the non-return valve 71 and the cooperating pipe 49a and lastly the third portion enters the pipe 21 for the main volume of injection through the non-return valve 72 and the pipe 49b. As soon as by reason of the opening of the hand operated valve 52, the pressure of the operating fuel rises in the pipes 17 and 21 beyond the pressure of the starting fuel, the corresponding non-return valves 71 and 72 stop automatically the admission of starting fuel to the corresponding injectors. The starting injectors 50 (Fig. 1) cease operating as soon as the pump 46 (Fig. 1) for the starting fuel is stopped.

Figures 3, 4, 5:
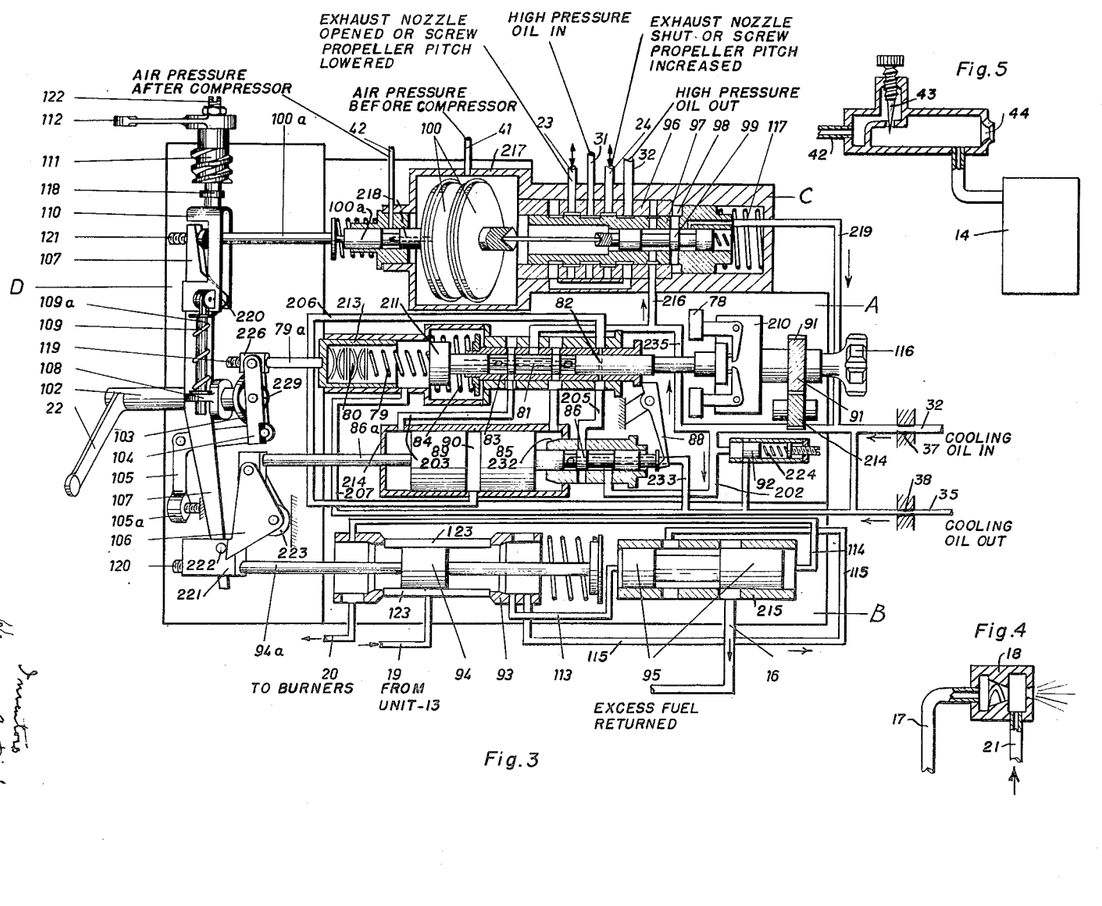
Fig. 3 illustrates partly in perspective view the actual measuring means.
Fig. 4 is a diagrammatic cross-section of a double output burner, drawn on a larger scale.
Fig. 5 is a diagrammatic longitudinal section of pipe 42 (Fig. 1) with the restriction and vent orifice therein.

The automatic regulator according to Fig. 3 includes the following members: a regulator A for running conditions, a fuel measuring device B, a temperature regulating system C and a leverage D.

Each of said members forms an arrangement playing a predetermined part and is to a large extent independent of the general arrangement. It is thus possible to provide for an assembly allowing the exchange of a complete member. The different members are arranged as follows:

The regulator A for running conditions is positioned centrally with the fuel measuring device B on one side, the temperature regulator C on the other and the leverage D to the front.

The regulator A comprises a centrifugal speed governor including crank levers 78 pivotally supported on a cross-member 210 fast with a rotary spindle 116 which is driven from the power-unit; the inner ends of crank levers 78 abut against an end of a valve 81 which is rotatably and slidably borne in a ported sleeve 83 and coupled with cross-member 210 to be driven therefrom; sleeve 83 is borne for axial sliding movement in a ported casing 212, and at its end away from the speed governor said casing 212 has an axially slidable end 213; the opposite end of valve 81 has a thrust ball bearing 211, a compression spring 79 and a bi-metallic compensating blade system 80 being interposed between bearing 211 and the slidable end 213 of casing 212.

The regulator A further comprises a pair of pistons 85, 69, guided in a cylinder 214 for movement towards and away from each other, providing a space 90 of variable volume between them; coupled with piston 85 is a sliding valve 86 having its outer end in contact with a swinging control lever for ported sleeve 83 as shown.

Driven from shaft 116 is a gear oil pump, the oil forcing gears of which have been shown for the sake of simplicity as comprising a driving gear 91 on shaft 116 and a driven gear 214. Oil is supplied to said pump through pipe 32 (see also Fig. 1) having a restriction 37 therein, and from said pump it is forced to casing 212 and casing 214 through pipes 235, 202; from said casing, oil is returned through a pipe 207 via restriction 38 (see also Fig. 1) to pipe 35. A valve 92 urged to cut-off position by a spring 224 is provided to maintain pressure on the delivery side of pump 91, 214.

The fuel measuring device B comprises a cylinder 93 in which a fuel metering piston 94 is slidably supported, said cylinder having a plurality of fuel inlet elongated ports 123 to which fuel is supplied through pipe 19; pipe 20 for delivering fuel to the burners starts from an end of cylinder 93; associated with cylinder 93 is a further cylinder 215 for a fuel return control valve 95 interposed between a pipe 115 from the end of cylinder 93 away from the first-named end thereof, and fuel return pipe 16; through pipes 113, 114, valve 95 is subjected and movable in response to the fuel pressure differential on either side of piston 94 in cylinder 93.

The temperature adjusting device C comprises manometric capsules 100 in a chamber 217 in which the air pressure before the air compressor prevails (pressure tap 41 also shown in Fig. 1) while, through tap 42 and a port 218 in a spindle 100a, the air pressure on the delivery side of the air compressor prevails within the capsules. Fast with the right side of capsules 100 is a pilot valve 99, slidably movable in a main sliding valve 97 which is slidably supported in a ported casing 96; between the right end of main valve 97 and the corresponding end of casing 96 is a spring 117; said end of valve 97 has an increased diameter, thereby providing a control oil chamber 98 between the valve and casing 96; pilot valve 99 is arranged to control inlet of oil from pipe 235, through a branch pipe 216, to chamber 98, and return of oil from said chamber to the inlet side of pump 91, 214 through a pipe 219. Main valve 97 is arranged to control supply of pressure oil from pipe 31 (see also Fig. 1) to either of pipes 23, 24, and return of oil from said pipes 23, 24 through pipe 32.

The lever system D includes a control lever 22, fast with a rotary shaft 102; at the end of shaft 102 away from lever 22 is a cam 103 arranged to contact a roller 229 on a lever 104, said lever 104 being pivotally connected, at an end thereof, with an adjustable bell-crank lever 105 while the other end is adjustably connected with a control rod 79a for the movable end 213 of valve casing 212.

Between spindle 100a fast with the left side of capsules 100, and the rod 94a of piston 94, is a lever 107 mounted for rocking movement about a pin 220 carried between the legs of a strap 110. The lower end of lever 107 engages a block 221 having a slot for accommodation of said lever, at the outer end of rod 94a and block 221 has an outwardly projecting lug 222 in contact with a rocking lever 106; lever 106 is pivotally connected to the rod 86a of piston 89, and intermediate the ends of lever 106 is a roller 223 movable along a stationary surface and providing a variable fulcrum for said lever.

Strap 110 is fast with a spindle 118, adjustably connected with a long-pitch screw 111, which is provided with a control lever 112 (see also Fig. 1) and engages a correspondingly screw-threaded portion of the casing for lever system D. Finally, between pivoting pin 220 for lever 107 and a lug 108 on shaft 102 is a spring 109 with a guiding stem passed therethrough.

The automatic regulator operates as follows:

The rotary slide valve 81 is subjected to the pressure of the spring 79 and to the centrifugal action of the small rotary weights 78 driven by the power unit. Through adjustment of the control lever 22, the control shaft 102 is caused to rotate together with the control cam 103; lever 104 is thereby swung and moves rod 79a so that the pressure of the spring 79 of the regulator is modified. If the valve 81 is submitted to unequal forces produced respectively by the centrifugal action of the masses 78 and by the spring 79, i. e. when the speed of rotation selected is no longer the operative speed, the valve 81 is moved axially away from its middle position (i. e. the position illustrated); according as it is moved to the right or to the left, it uncovers a port to pipe 203 or a port to pipe 204, following which pressure oil from pipe 32, pump 91—214, and pipe 235 is caused to act on either piston 89 or piston 85. By reason of an oil cushion present in space 90 between said pistons and providing a rigid push member, both pistons are shifted together in the same direction, thereby rocking lever 106 through rod 86a and hence moving piston 94 to another fuel flow control position; as a consequence the delivery of fuel from pipe 19 to pipe 20 and thence to the burner system is altered. It will be appreciated that rocking lever 106 which has a variable fulcrum (roller 223) causes in effect an alteration of the amplitude of movement of the piston 94 of the fuel measuring device in accordance with the corresponding fuel output whereby large variations are provided for large outputs and conversely small variations are obtained for low outputs. The equilibrating valve 95 is inserted in parallel with the fuel measuring device B through the agency of the pipes 113 and 114. It has for its object to submit the two sides of the piston 94 to an equivalent pressure of fuel and to reduce the pressure of return flow in the pipe 115 to the value of that in the pipe 16. The bi-metallic compensator 80 mounted to the front of the regulator spring 79 has for its object to keep the speed of rotation at a value independent of the temperature of the regulator. The oil fed from pipe 32 to gear pump 91, 214 is withdrawn from the lubricating circuit for the turbine and compressor, and spring urged valve 92 maintains a constant oil pressure on the delivery side of 91, 214 irrespectively of the actual pressure in said lubricating circuit. Upon bodily movement of pistons 89, 85 as above described, valve 86 is displaced therewith, causing lever 88 to rock; ported sleeve 83 is thus shifted axially in casing 212, gradually causing the ports to pipes 203, 204 and be shut. Furthermore, as pistons 89, 85 are moved bodily, valve 86 uncovers a port to pipe 205, whereby, according to the direction of movement of valve 86, pressure oil is fed from pipe 202, via pipe 205, rotary port 82 (in valve 81) and pipe 206 to space 90 between pistons 85, 89 increasing the volume of oil cushion, or oil from said cushion egresses through pipe 206 to oil return pipe 35 via rotary port 82, pipe 205, radial and axial ports 232 in valve 86, pipe 233 and pipe 207. The process continues until the parts reassume their original positions. It will be appreciated that the oil flow through rotary port 82 is slow, so that the alteration of the oil cushion volume takes place but slowly, in correspondance with the slow modification of the engine running conditions produced by the regulation, by reason of the engine inertia.

The temperature regulator C operates as follows: The constancy of the temperature of admission to the turbine is practically provided for all rates of operation, if for a constant speed of rotation of the engine, the output of fuel $D_1$ and the difference in pressure $\Delta p$ satisfies the relationship $D_1 = k_1 + k_2 . \Delta p$ as mentioned hereinabove. Hence, the temperature regulator C is provided to control the temperature of gas supplied to the turbine through indirect means, specifically in dependance on the fuel supply to the burner system as controlled by fuel metering piston 94 and the pressure differential across the compressor.

The drop in pressure $\Delta p$ across the compressor is measured by means of manometric capsules 100; the pressure on the upstream side of the compressor is applied through the pipe 41 to the outside of the capsules while the pressure on the downstream side of said compressor is transmitted through the pipe 42 to the inside of said capsules. The volume $D_1$ of fuel supplied to the burner system is defined by the actual location of the piston 94 of the fuel flow metering means or of the rod 94a of said piston. The position of rod 94a controls that of spindle 100a fast with the left side of capsules 100, through lever 107 pivotally supported at 220 in strap 110. The lengths of the arms of the lever 107 are defined by the constant $k_2$ appearing in the relationship $D_1 = k_1 + k_2 . \Delta p$. The adjustment of the jet reaction nozzle takes place as follows:

Upon displacement of valve 99 from the position shown, whether the displacement is caused by capsules 100 and/or by lever 106 acting on spindle 100a, ports in sleeve 97 are uncovered and oil pressure from pump 91, 214 is supplied to chamber 98 via pipes 235 and 216, or oil egresses from said chamber through pipe 219; consequently sleeve 97 is moved axially in one or the opposite direction. Sleeve 97 thus uncovers ports in casing 96, following which high pressure oil from pipe 31 is supplied to the nozzle control servo-motor (of any conventional hydraulic type)

through either pipe 23 or pipe 24, while high-pressure oil is released from the servo-motor through either pipe 24 or 23 to oil return pipe 32.

It will be appreciated that the force developed by manometric capsules 100 upon expansion or shrinking thereof is very slight and could not be effective to operate supply of pressure oil directly to servo-motor 25; it is for that reason that according to the construction shown, the capsules are caused to move an intermediate sleeve valve, viz. 97, which in turn controls supply of high pressure oil to and from servo-motor 25.

In order to ensure a sufficient stability of regulation, there has been provided a mechanical control of the position of the needle valve of the nozzle or else of the airscrew propeller blade pitch. For that purpose, the lever 112, the long pitched screw 111 and the strap 110 allow a shifting of the pivot pin 220 of the lever 107 so as to provide for a modification of the ratio of amplification of this lever. This produces an action opposing the adjusting movement as soon as it begins, so as to put an end to the adjustment without any oscillation.

It is also possible through action on the overload control stop 108 to shift the strap 110 and consequently the pivot pin 220 of the power multiplying lever 107. This shifting has for its object a modification in the ratio of amplification of the lever 107 and consequently in the ratio between air and fuel which leads to an increase in temperature during a short time so as to produce peak power at this moment without increasing thereby the speed of rotation under full load conditions. An action as just described of the overload control stop 108 on strap 110 does not take place until the control lever 22 is shifted beyond the position of full load in opposition to the pressure of the spring 109.

In order to adjust the regulator, in other words when it is desired to make predetermined lengths of the control levers correspond with the characteristic data of the regulator while compensating any allowances in manufacture and adapting the regulator to the reactor, the following possibilities have been provided:

The shape of the curve of adjustment or of response of the regulator for running conditions may be modified by changing the operative length of push rod 79a and also the operative length or leverage of lever 104. The first change is effected by turning the outer end 119 of rod 79a which for that purpose has a screw threaded engagement with a nut 226 pivotally mounted on lever 104, and the second change is effected by turning a screw 105a which engages a stationary surface and has screw-threaded engagement with lever 105 so that the fulcrum provided by lever 105 for lever 104 is displaced. It is further possible to alter the position of block 221 which provides for coupling lever 107 with the rod 94a of fuel metering piston 94, by turning the outer end 120 of rod 94a which has a screw threaded engagement with rod 94a for that purpose. The coupling of the lever 107 with spindle 100a of the manometric capsules 100 may be adjusted through the agency of the screw 121. The speed-multiplying ratio of the transmission lever 107 and thereby the adjustment in temperature is obtained through a displacement of pivot pin 220 for lever 107. For that purpose, spindle 118 from which strap 110 hangs has a screw-threaded upward extension 122 which is screwed in high-pitch screw 111, so that by turning the protruding upper end of extension 122, strap 110 may be raised or lowered.

All these screws are within easy reach from the outside and allow an adjustment of the regulator after assembling and mounting.

The adjusting and feeding arrangement described shows the following advantages:

The subdivision of the arrangement into controlling and adjusting apparatuses, that is the separation made between the driven parts and the non-driven parts as, also the assembling of the regulator under the form of sections playing parts that are substantially independent provides a simple structure and allows contemplating further improvements both from a constructional standpoint as also in the principle of operation. The modification of one section will not lead to a modification of another. The connecting elements between the different sections are constituted only by pipes and relatively strong linkwork for manual control from a single lever. In the elements that serve directly for the feed of fuel, that is in the controlling apparatus and in the fuel measuring device, only fuel is caused to flow. In the case of a failure of the automatic regulator, it is possible to control the reaction jet engine by hand through the agency of the control apparatus. It is also possible to use for the different elements different materials suiting the purpose, for instance resisting high pressures where required. The subdivision into small independent groups makes the manufacture easier with a possible machining of all the surfaces of said groups while the adjustment and inspection may be made independently for each group before the final mounting. The exchange of one element for another, for instance in the case of adaptation to another reaction jet engine of the same or a different type can be effected easily. The mounting of the regulator according to the invention, under the form of three juxtaposed groups and a front group, the driving being performed through the medial group, provides an aggregate apparatus of a flat substantially symmetrical outline, the adjusting elements of which, and also the pipe connections, are arranged in a particularly fortunate manner while the levers located in the corresponding group are given a suitable length. The connections with the fuel pipes are arranged on one side and those for the oil under pressure on the other. An arrangement for the pipes having for its object a reduction in bulk is also possible. The regulator may be adjusted from the outside. In the section containing the amplifying mechanism all the parts lie in direct proximity with one another.

What we claim is:

1. For a turbo-plant having a fuel burner system, a pressure fuel trunk line, a gas turbine and an air compressor driven from said turbine, and for combination with a unit for automatically controlling the rate of flow of fuel to said burner system in dependence on the speed of said gas turbine, a hand-controlled fuel metering device which forms a unit in itself and comprises a basic fuel line, a main fuel line and a discharge fuel line connected with said trunk line to receive the fuel effluent therefrom, hand controlled valve means in said basic fuel line and said main fuel line for controlling the rate of flow of fuel therethrough in interdependence, means for connecting said main fuel line with said first-named unit and thereby causing the effluent from said main fuel line to be controlled by said first-named unit before being forwarded to said fuel burner system, said basic fuel line being connected with said fuel burner system, and a slow-running fuel line branched off from said trunk line in parallel with the first-named three lines with said hand-controlled valve means also inserted therein so as also to have the rate of flow of fuel therethrough controlled by said valve means, said slow-running fuel line being connected with said main fuel line past said valve means and having an adjustable flow restricting member inserted therein.

2. For a turbo-plant having a fuel burner system, a pressure fuel trunk line, a gas turbine and an air compressor driven from said turbine, and for combination with a unit for automatically controlling the rate of flow of fuel to said burner system in dependance on the speed of said gas turbine, a hand-controlled fuel metering device which forms a unit in itself and comprises a basic fuel line, a main fuel line and a discharge fuel line connected with said trunk line to receive the fuel effluent therefrom, hand controlled valve means in said basic fuel line and said main fuel line for controlling the rate of flow of fuel therethrough in interdependance, means for connecting said main fuel line with said first-named unit and thereby causing the effluent from said main fuel line to be controlled by said first-named unit before being forwarded to said fuel burner system, said basic fuel line being connected with said fuel burner system, a restriction in said means for connecting said main fuel line with said first-named unit, and means in said main fuel line responsive to the fuel pressure difference across said restriction for discharging a variable portion of fuel from said main fuel line.

3. For a turbo-plant having a fuel burner system, a pressure fuel trunk line, a gas turbine and an air compressor driven from said turbine, and for combination with a unit for automatically controlling the rate of flow of fuel to said burner system in dependance on the speed of said gas turbine, a hand-controlled fuel metering device which forms a unit in itself and comprises a basic fuel line, a main fuel line and a discharge fuel line connected with said trunk line to receive the fuel effluent therefrom, hand controlled valve means in said basic fuel line and said main fuel line for controlling the rate of flow of fuel therethrough in interdependence, means for connecting said main fuel line with said first-named unit and thereby causing the effluent from said main fuel line to be controlled by said first-named unit before being forwarded to said fuel burner system, said basic fuel line being connected with said fuel burner system, a restriction in said basic fuel line, a movable fuel flow control member in said basic fuel line between said valve means and said restriction, and means responsive to the fuel pressure difference across said restriction for moving said movable fuel flow control member.

4. For a turbo-plant having a fuel burner system, a pressure fuel trunk line, a gas turbine and an air compressor driven from said turbine, and for combination with a unit for automatically controlling the rate of flow of fuel to said burner system in dependance on the speed of said gas turbine, a hand-controlled fuel metering device which forms a unit in itself and comprises a basic fuel line, a main fuel line and a discharge fuel line connected with said trunk line to receive the fuel effluent therefrom, a hand controlled valve means in said basic fuel line and said main fuel line for controlling the rate of flow of fuel therethrough in interdependance, means for connecting said main fuel line with said first-named unit and thereby causing the effluent from said main fuel line to be controlled by said first-named unit before being forwarded to said fuel burner system, said basic fuel line being connected with said fuel burner system, and a main fuel portion delivery line from said first named unit to said burner system, arranged to pass via said hand-controlled fuel metering device and having within said device, a fuel throttle valve which is subjected to the fuel pressure in said delivery line on one side and resiliently biassed-to-closure on the other side.

5. For a turbo-plant having a fuel burner system, a pressure fuel trunk line, a gas turbine and an air compressor driven from said turbine, and for combination with a unit for automatically controlling the rate of flow of fuel to said burner system in dependance on the speed of said gas turbine, a hand-controlled fuel metering device which forms a unit in itself and comprises a basic fuel line, a main fuel line and a discharge fuel line connected with said trunk line to receive the fuel effluent therefrom, hand controlled valve means in said basic fuel line and said main fuel line for controlling the rate of flow of fuel therethrough in interdependance, means for connecting said main fuel line with said first-named unit and thereby causing the effluent from said main fuel line to be controlled by said first-named unit before being forwarded to said fuel burner system, said basic fuel line being connected with said fuel burner system, a slow-running fuel line branched off from said trunk line in parallel with the first-named three lines with said hand-controlled valve means also inserted therein so as also to have the rate of flow of fuel therethrough controlled by said valve means, said slow-running fuel line being connected with said main fuel line past said valve means and having an adjustable flow restricting member inserted therein, and means responsive to variations in said air pressure difference across said air compressor, for discharging a variable fuel portion from said slow-running fuel line.

6. In an aircraft having a combustion chamber provided with a fuel burner system, a pressure fuel line for feeding said fuel burner system, an air compressor for supplying air to said combustion chamber, a gas turbine connected with said combustion chamber to receive the effluent therefrom as a motive gas and coupled with said air compressor for driving the same, and adjustable means receiving motive energy from said effluent for propelling said plant, the combination of two separate units for controlling the rate of fuel flow from said line to said burner system, the first of said units being connected with said line to receive the fuel effluent therefrom and comprising means which include a hand-controlled device, for discharging a variable fuel portion from said fuel effluent, while the second of said units is connected with said first unit to receive the remainder of said fuel effluent therefrom and comprises means having a movable control member for discharging a further variable fuel portion from said remainder of fuel effluent; a centrifugal governor adapted to be driven from said turbine; a pressure deformable device for adjusting said plant propelling means; means responsive to the air pressure difference across said compressor for operating said pressure deformable device, said means including an air pressure transmitting pipe from one side of said compressor to said pressure deformable device, said pipe having a vent orifice and a restriction of adjustable cross area between said air compressor and said vent orifice; means operatively associated with said centrifugal governor, for moving said movable control member in response to turbine speed variations; means for delivering the undischarged portion of said remainder of fuel effluent to said fuel burner system; and means responsive to the position of said movable member for altering the adjustment of said propelling means from said pressure responsive device.

References Cited in the file of this patent
UNITED STATES PATENTS

| Number | Name | Date |
|---|---|---|
| 2,306,953 | Jung | Dec. 29, 1942 |
| 2,411,065 | Silvester | Nov. 12, 1946 |
| 2,422,808 | Stokes | June 24, 1947 |
| 2,457,595 | Orr | Dec. 28, 1948 |
| 2,508,260 | Holley | May 16, 1950 |